United States Patent
Geiger

(10) Patent No.: US 7,625,274 B2
(45) Date of Patent: Dec. 1, 2009

(54) VENTILATION DEVICE

(75) Inventor: Hary Geiger, Unterschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 378 days.

(21) Appl. No.: 11/206,860

(22) Filed: Aug. 19, 2005

(65) Prior Publication Data

US 2006/0035578 A1  Feb. 16, 2006

Related U.S. Application Data

(63) Continuation of application No. PCT/EP2004/014449, filed on Feb. 16, 2004.

(30) Foreign Application Priority Data

Feb. 21, 2003 (DE) .................................. 103 07 476

(51) Int. Cl.
*B60H 1/00* (2006.01)
(52) U.S. Cl. ....................................... 454/121
(58) Field of Classification Search .................. 454/121
See application file for complete search history.

(56) References Cited

U.S. PATENT DOCUMENTS 5,313,072 A * 5/1994 Vachss ........................ 250/573
5,657,929 A * 8/1997 DeWitt et al. ............. 239/284.2
6,236,180 B1 * 5/2001 Contos et al. ................ 318/444
2002/0005440 A1 * 1/2002 Holt et al. ................. 239/284.2

FOREIGN PATENT DOCUMENTS

| DE | 37 21 659 A1 | 1/1989 |
|----|----|----|
| DE | 38 13 548 A1 | 11/1989 |
| DE | 43 16 557 A1 | 11/1994 |
| DE | 198 39 507 A1 | 3/2000 |
| EP | 0 330 827 | 9/1989 |
| EP | 0 830 963 A2 | 3/1998 |
| JP | 2002029583 A * | 1/2002 |
| JP | 2005002066 A * | 1/2005 |

* cited by examiner

*Primary Examiner*—Steven B McAllister
*Assistant Examiner*—Samantha A Miller
(74) *Attorney, Agent, or Firm*—Crowell & Moring LLP

(57) ABSTRACT

A ventilation device for ventilating the interior of a motor vehicle, and a method therefore, in which sensor for determining at least one parameter reflecting the degree of glass condensation is used to determine whether to maintain the vehicle ventilation system in recirculation mode during the actuation of a windshield and/or headlight washer, or to switch to a fresh air mode. In response to the sensor signals, an evaluation device generates a signal for at least temporarily switching to fresh air mode when a parameter value exceeds a predefined value, or generates a time period for a residence time to be observed in recirculation air mode.

6 Claims, 2 Drawing Sheets and Summary of the Invention

This application is a continuation of International Patent Application No. PCT/EP2004/001449, filed Feb. 16, 2004, the entire disclosure of which is incorporated herein by reference. Priority is claimed based on German Patent Application No. 103 07 476.7, filed Feb. 21, 2003.

BACKGROUND AND SUMMARY OF THE INVENTION

The invention relates to a ventilation device for the interior of a motor vehicle having means for switching between a recirculation air mode and a fresh air mode, and a method for ventilating the interior of a motor vehicle.

Heretofore, the wash water spray nozzles for the cleaning unit for the windshield of a motor vehicle have always been located in the vicinity of the air intake for the ventilation, i.e., air conditioning system. As a result, when the cleaning unit is actuated the air intake region of the ventilation or air conditioner system is wetted by the wash water, and thus by the cleaning additives contained therein and emitted therefrom. This is also a problem when the washer unit for the headlights is actuated, since, depending on the travel speed, the wash water likewise more or less wets the windshield or the air intake region of the ventilation or air conditioner system. Because both cleaning units are generally actuated together in a cyclical manner, the wetting effect is further intensified. Known ventilation devices for motor vehicle ventilation or air conditioner systems either draw the air which is wetted with wash water additives into the interior of the vehicle, or when the cleaning unit is actuated switch from fresh air mode to recirculation air mode, in which fresh air is no longer drawn in from the outside.

A generic ventilation device is known from German patent document DE 38 13 548 A1. This ventilation device avoids drawing in the gases, which are generated from the wash water exiting from the windshield washer nozzles in the fresh air intake region, by closing the fresh air valve and switching the ventilation device to recirculation air mode when the wash water spray nozzles are actuated. After a predeterminable residence time the system automatically switches back to fresh air feed.

Furthermore, a device is known from European patent document EP 0 330 827 A1 in which the fresh air feed to the interior of the motor vehicle is likewise interrupted when the windshield washer unit is actuated, and is resumed after a predeterminable time.

In the devices according to the prior art, it is disadvantageous that within the residence time for recirculation air mode, condensation can form on the glass which impairs safety, forcing the driver to perform a manual intervention, deactivate the recirculation air, and turn on the defroster function. This causes the driver to be unsafely distracted from the traffic situation.

An object of the invention is to provide a ventilation device of the aforementioned type which minimizes the load of fresh air drawn in, along with detergent additive gases generated by actuation of the windshield washer, and which also further increases the safety in control of the vehicle.

This object is achieved by a ventilation device which switches between a recirculation air mode and a fresh air mode, comprising at least one condensation sensor for determining at least one parameter reflecting the degree of glass condensation or probability of glass condensation, and at least one evaluation device. In one embodiment, the evaluation device as a function of this/each determined parameter generates a signal for at least temporarily switching to fresh air mode when a parameter limiting value exceeds a predefined value. Alternatively, for generating a signal for the fresh air-recirculation air switching, one further embodiment provides for the generation or determination of a time period for a residence time to be observed in recirculation air mode. According to the invention, it is possible to effectively prevent condensation on the glass of a motor vehicle which impairs driving safety by detecting at least one parameter for the condensation present on the glass, using a condensation sensor, and evaluating the detected parameter using an evaluation device, and indirectly or directly actuating a closing device for switching to recirculation air mode using a control device. Actuation of the cleaning unit initiates a signal for closing the closing device and thus for switching to recirculation air mode. Then, by use of the evaluation device and the control device the closing device is indirectly or directly actuated as a function of the degree of probability of glass condensation (indirect actuation) or condensation actually present on the glass (direct actuation).

The indirect actuation is achieved by detecting and evaluating beforehand at least one parameter of glass condensation which is actually not visible and is thus being formed (e.g., air moisture and/or inside temperature and/or outside temperature) for the probability of glass condensation. In other words, before visible condensation on the glass is even present, a reliable prediction may be made as to when the glass is likely to have condensation such that safety in controlling the vehicle is impaired due to poor visibility caused by glass condensation. Based on this prediction, an appropriate decision may then be made as to when the ventilation device should be switched from recirculation air mode to fresh air mode or partial fresh air mode (mixed mode) to reliably avoid condensation on the glass. To avoid the transport of moist air to the glass, in an intermediate step before switching from recirculation air to fresh air mode it is possible to prevent air feed to the glass (fresh air feed in the vehicle interior but not in the glass region) to delay the formation of condensation or, alternatively, to extend the residence time in recirculation air mode.

The direct actuation of the closing device for switching from recirculation air mode to fresh air mode is achieved by detecting and evaluating at least one parameter for determining glass condensation which is actually already visible (e.g., air moisture and/or inside temperature and/or outside temperature). In this case, visible condensation on the glass is thus already present (the parameter to be detected and evaluated has therefore already exceeded a predefined parameter limiting value), on the basis of which a switch from recirculation air mode to fresh air mode is directly made.

In both cases (indirect or direct actuation) the switch may be made from 100% recirculation air mode to 100% fresh air mode. In one preferred embodiment, a phased transition from recirculation air mode to fresh air mode is provided, the switch from recirculation air mode to fresh air mode being made by continuous or steplike opening or closing of the closing device.

For the switch to recirculation air mode initiated by actuation of the cleaning unit, hardware and/or software are provided which enable the activation of the wash water spray nozzles to be temporarily delayed. When activation of the wash water spray nozzles is delayed, the closing device for recirculation air mode is temporarily brought into the closed position before the wash water spray nozzles are activated. For an undelayed activation of the wash water spray nozzles, the closing device and wash water spray nozzles are actuated simultaneously. Switching between these two operating modes can be achieved manually, using a switch, or automatically as a function of boundary parameters (e.g., outside air moisture and/or outside air temperature and/or outside air contaminants).

The invention further relates to a method for ventilating the vehicle interior, using the device according to the invention, in which, initiated by actuation of the cleaning unit, a signal for closing the closing device (switching to recirculation air mode) is generated and at least one parameter for a degree of glass condensation or the probability of glass condensation is determined, and as a function of each determined parameter, either a signal is generated for directly opening the closing device and thus for switching, at least in some areas, to fresh air mode by comparing to a predefined limiting value, or an indirect opening is initiated by determining a time period to be observed for the closed position of the closing device, and after this time period has elapsed the closing device is opened at least in some areas. In this regard, the signal generation for actuating the wash water spray nozzles and the signal generation for closing the closing device may be achieved either simultaneously or successively (closing of the closing device and subsequent activation of the wash water spray nozzles). Switching between these two operating modes may be accomplished either manually, using a switch, or automatically as a function of boundary parameters (e.g., outside air moisture and/or outside air temperature and/or outside air contaminants).

The layout of the sensor(s) according to design and type depends on the parameter variable(s) to be detected. Thus, in particular the use of an air moisture sensor alone or in combination with an outside and/or inside temperature sensor is possible. In addition, the previous progression over time of these variables may be of interest for a decision as to whether recirculation or fresh air mode is necessary, and therefore included in the evaluation of the parameters. Consequently, these variables could be continuously detected when the cleaning unit is not actuated or the vehicle is not operating, and in each case data stored in a time window, so that upon start-up of the vehicle or actuation of the cleaning unit after a period of not being actuated these data may be accessed via an evaluation device, and based on instantaneous data, actuation may be achieved directly after initiation using an actuation device for recirculation air-fresh air. Both the evaluation device and the actuation device are preferably integrated into the engine control unit or a control device which monitors the control function of the air conditioning system. In particular, these devices may be incorporated in the form of programming into the existing resources of standard control devices already in use (e.g., air conditioning controls). The evaluation and actuation devices are designed in such a way that the switch to recirculation air mode is either initiated or terminated after activation of the cleaning unit but temporarily before an actual spray function of a wash water spray nozzle, or the spray function and switch to recirculation air mode are initiated essentially at the same time. The temporarily delayed switch to recirculation air has the advantage that, as the result of activation of a wash nozzle and the subsequent switch from fresh air to recirculated air, there is increased assurance that interfering gases from the washer fluid do not enter the interior of the vehicle.

Other objects, advantages and novel features of the present invention will become apparent from the following detailed description of the invention when considered in conjunction with the accompanying drawings.

DETAILED DESCRIPTION

Figure 1:
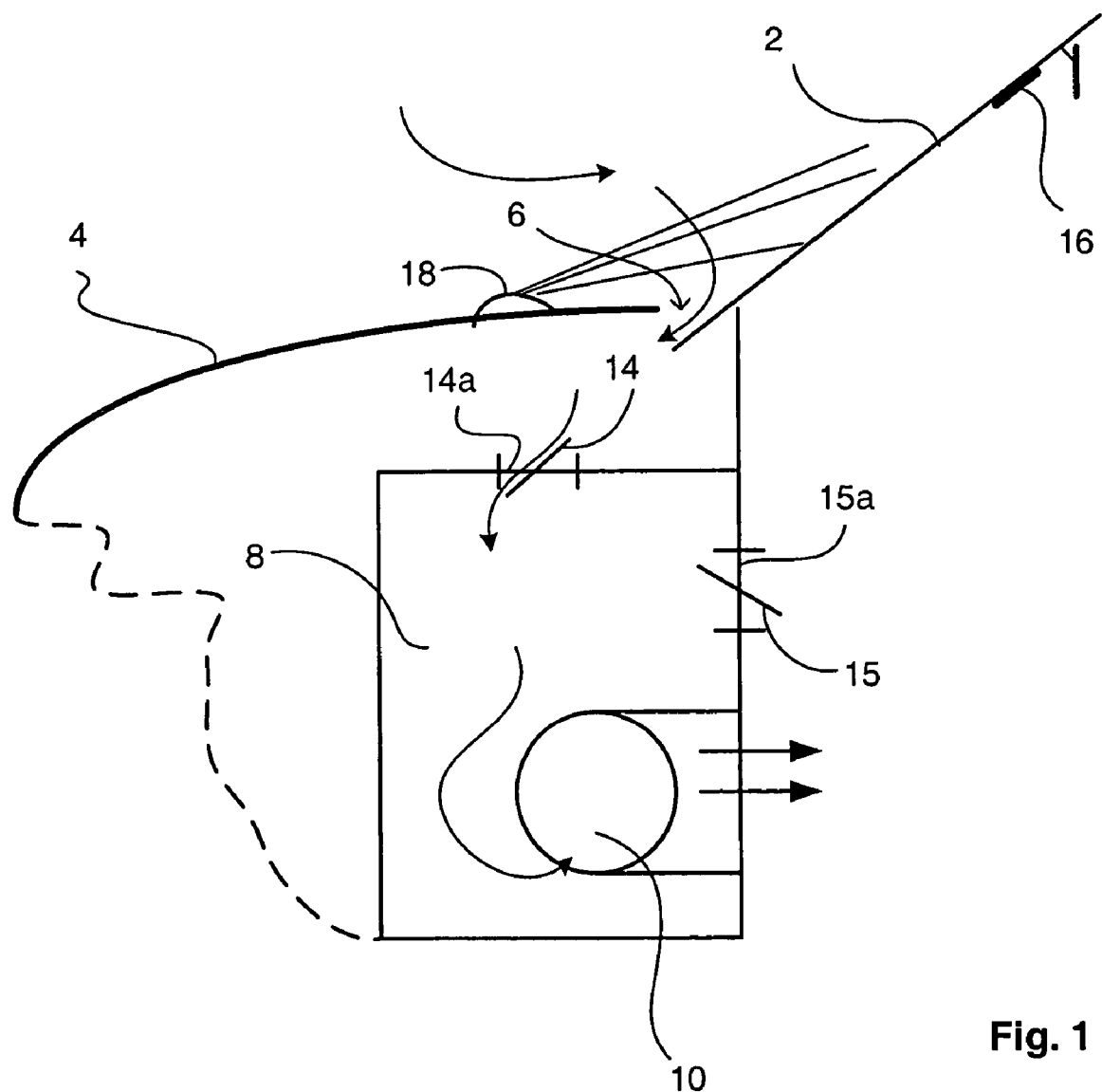
FIG. 1 shows components of a ventilation device according to an embodiment of the invention, in schematic illustration.

FIG. 1 shows in schematic illustration a section of the front region of a motor vehicle. Illustrated is the region of the rear engine compartment, adjoining the vehicle interior, having an air intake region 6 situated between a windshield 2 and a hood 4 by which fresh air may be conveyed into the vehicle interior by a ventilation device according to the invention (fresh air mode). The inventive ventilation device for the interior of a motor vehicle essentially comprises a fan 10, situated in a fan chamber 8, for air exchange or air circulation of the air in the vehicle interior, a control unit 12a for actuating a closing device 14 which connects the fan chamber 8 to, or separates it from, the air intake region 6, a condensation sensor 16 for detecting at least one parameter for the degree of glass condensation actually present or the probability of glass condensation expected for a brief time afterwards, and evaluation device 12b for corresponding evaluation of the at least one parameter, the closing device 14 being actuated via the control unit 12a as a function of the evaluation. On the intake side, the fan chamber 8 is connected via a first opening 14a, which is opened and closed by the closing device 14, to the air intake region 6 on the one hand, and on the other hand is connected via a second opening 15a, which is opened and closed by a second closing device 15, to the vehicle interior. The fan 10 located in the fan chamber 8 thus draws in fresh air from the outside and/or vehicle interior air from the vehicle interior, depending on the position of the closing devices 14, 15, conveys the air into the vehicle interior, and thereby achieves an appropriate air exchange (fresh air mode) or an appropriate air circulation (recirculation air mode). The condensation sensor 16 is preferably situated on the interior of the windshield 2, in particular in the upper center region thereof, where the inside rearview mirror is also frequently adhesively bonded. This has the advantage that the windshield region, which has the greatest tendency for condensation, is monitored and condensation can be promptly counteracted. In addition, sensors may preferably be situated at multiple locations within the vehicle interior, in particular on the inside of the windshield. Alternatively or additionally, the temperature and/or moisture sensors (condensation sensor) may be positioned in the air stream toward the glass, in particular in the air stream toward the windshield. The control unit 12a and the evaluation device 12b may be implemented separately in individual instruments, or, preferably, together with other control units in a common control device. The control unit 12a and the evaluation device 12b are preferably integrated into an existing control device, such as the engine control unit or the air conditioning control unit. Depending on the parameters to be evaluated (preferably air moisture and/or temperature), the condensation sensor 16 includes various functions and may be selected accordingly. The evaluation device 12b is designed in such a way that, depending on each parameter determined, either a signal is generated for opening the closing device 14 and thus for switching, at least in some areas, to fresh air mode by comparing to a predefined limiting value, or a time period to be observed is determined for the closed position of the closing device 14, and after this time period has elapsed (connection of a timer) the closing device 14 is opened at least in some areas. The second closing device 15 is simultaneously actuated to ensure an appropriate recirculation air mode or a mixed recirculation air-fresh air mode. This actuation is also preferably carried out via the control unit 12a.

Figure 2:
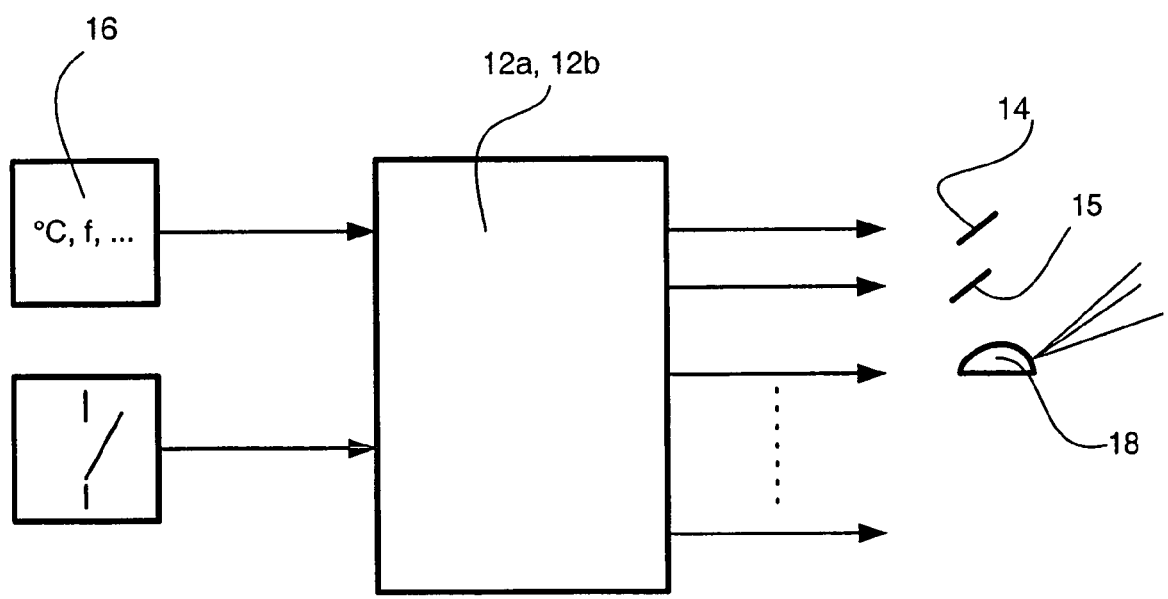
FIG. 2 shows the ventilation device according to FIG. 1 in a simplified functional block diagram.

FIG. 2 schematically shows the functional relationships of the individual components of the ventilation device according to the invention. According to the illustration a control device, comprising an integrated control unit 12a and an integrated evaluation means 12b, on the input side receives a signal from the condensation sensor 16 and an additional signal from an additional sensor which detects the activation of the cleaning unit. The additional sensor may detect, for example, the actuation of the windshield washer switch or the activation of the windshield washer pump, or a signal equivalent thereto. On the output side the control device is mechanically linked, for example to a windshield washer spray nozzle 18 for activation thereof, and to the closing devices 14, 15 for controlling the various operating modes of recirculation air mode, fresh air mode, or mixed recirculation air-fresh air mode.

The device according to the invention may be designed as a separate unit or as a component of an air conditioning system. Thus, the device according to the invention, integrated into an overall system, may for example interrupt the residence time specified by an automatic recirculation air switching by means of an automatic recirculation air control system (such as by increased exhaust gas monitoring by contaminant sensors), and force switching to fresh air mode or mixed mode. In this case, the device is for example incorporated into the overall control system for the air conditioning, and in this instance forms a component of a control circuit.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Ventilation device for the interior of a motor vehicle, which is switchable between a recirculation air mode and a fresh air mode, comprising:
    an airflow mode switching device;
    at least one condensation sensor for determining at least one parameter reflecting at least one of a degree of glass condensation or a probability of glass condensation;
    an evaluation device, wherein said evaluation device generates a signal for at least one of temporarily switching the air mode switching device to fresh air mode when the at least one parameter exceeds a predefined value, or generating a time period for a residence time to be observed in recirculation air mode, and
    a delayed spray initiation device for temporarily successively initiating the generation of a signal or a signal sequence for switching to recirculation air mode and the temporarily delayed initiation of the spray function when a wash water spray nozzle is activated.

2. Method according to claim 1, wherein air feed to the glass is prevented before switching to partial fresh air mode or full fresh air mode.

3. Ventilation device according to claim 1, wherein the condensation sensor is situated in an upper center region of a windshield.

4. Ventilation device according to claim 3, further comprising:
    an airflow control device which prevents air feed to the windshield before switching to partial fresh air mode or full fresh air mode.

5. Method for ventilating the interior of a motor vehicle, comprising the steps of:
    activating a wash water spray nozzle;
    determining at least one parameter for a degree of glass condensation or probability of glass condensation;
    generating as a function of the at least one determined parameter at least one of a signal for at least temporarily switching to fresh air mode when a parameter limiting value exceeds a predefined value, or a time period for a residence time to be observed in recirculation air mode; and
    controlling an airflow mode of a ventilation device switchable between a recirculation air mode and a fresh air mode in response to said signal,
    wherein the initiation of the spray function of the wash water spray nozzle is temporarily delayed after generation of a signal for controlling the airflow mode to the fresh air mode opening the closing means.

6. Method according to claim 5, wherein air feed to the glass is prevented before switching to partial fresh air mode or full fresh air mode.

* * * * *

UNITED STATES PATENT AND TRADEMARK OFFICE
CERTIFICATE OF CORRECTION

PATENT NO. : 7,625,274 B2 Page 1 of 1
APPLICATION NO. : 11/206860
DATED : December 1, 2009
INVENTOR(S) : Hary Geiger It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 534 days.

Signed and Sealed this

Twenty-first Day of December, 2010

David J. Kappos
*Director of the United States Patent and Trademark Office*